E. C. S. PARKER.
METHOD OF AND APPARATUS FOR PRODUCING PHOTOGRAPHS AND PROJECTING THE SAME
IN NATURAL COLORS.
APPLICATION FILED MAY 9, 1919.
1,328,291. Patented Jan. 20, 1920.
3 SHEETS—SHEET 1.
Fig.1.
Fig.2.
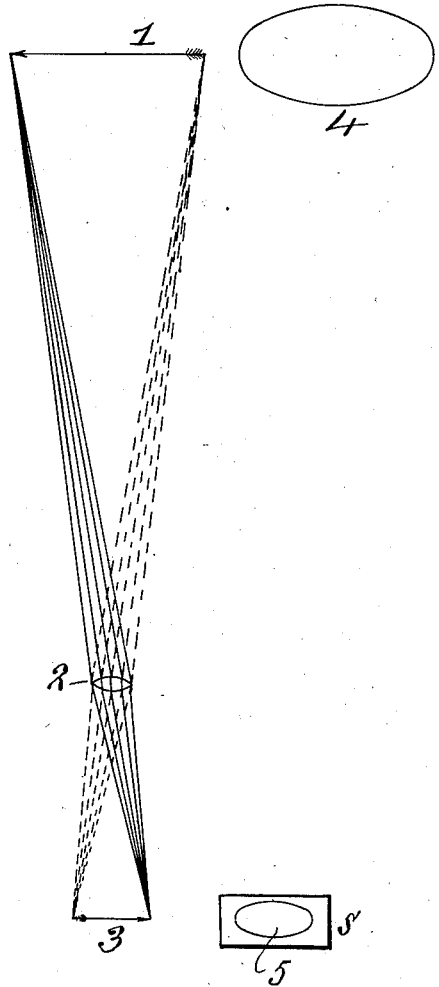
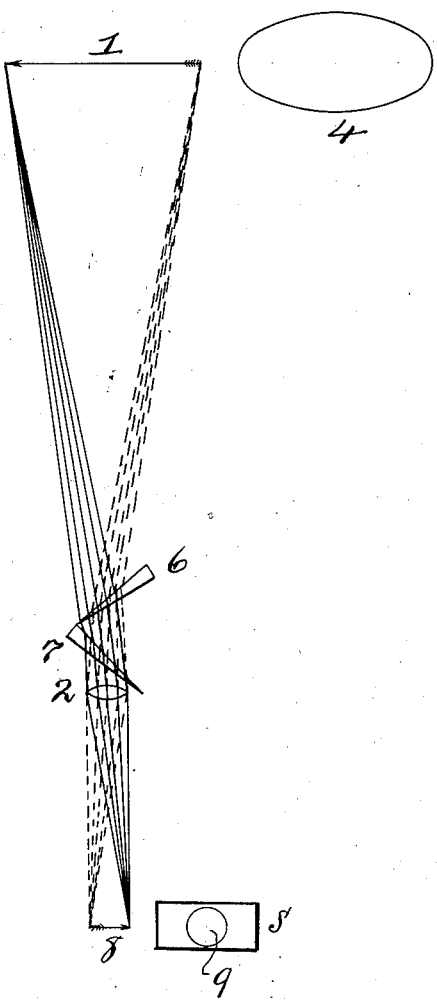
Inventor
Edward C. S. Parker
By his Attorney E. C. S. PARKER.
METHOD OF AND APPARATUS FOR PRODUCING PHOTOGRAPHS AND PROJECTING THE SAME IN NATURAL COLORS.
APPLICATION FILED MAY 9, 1919.
1,328,291.
Patented Jan. 20, 1920.
3 SHEETS—SHEET 2.
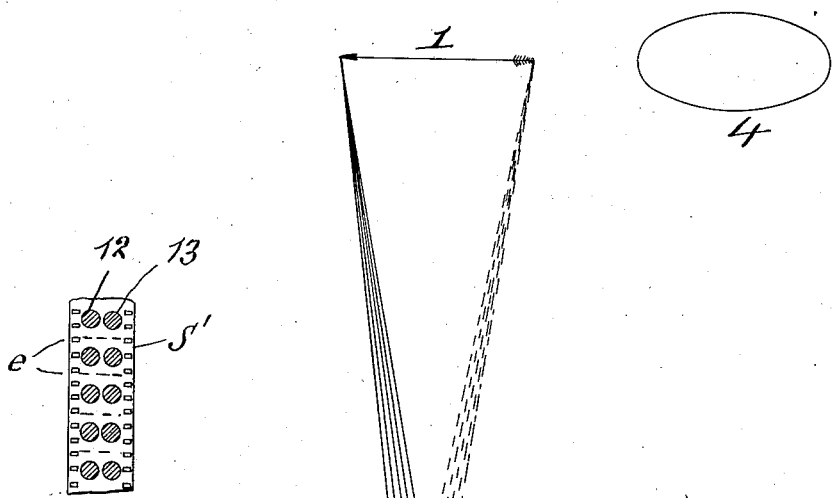
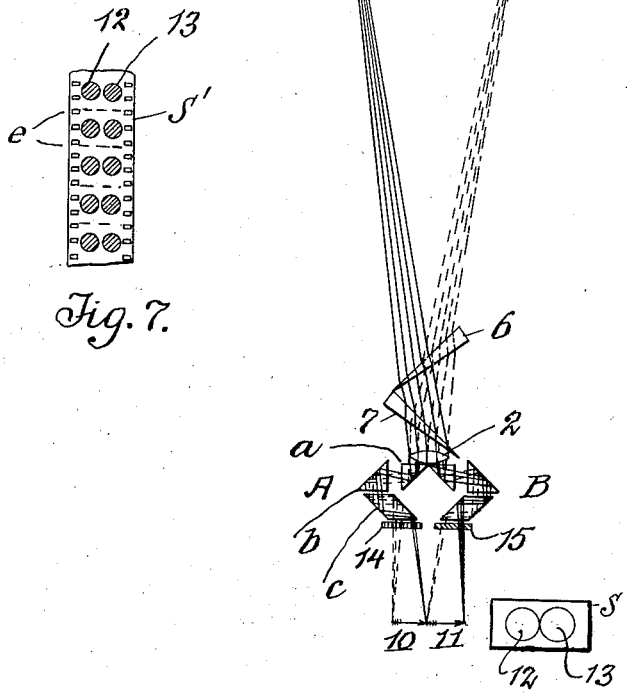
Inventor
Edward C. S. Parker
By his Attorney

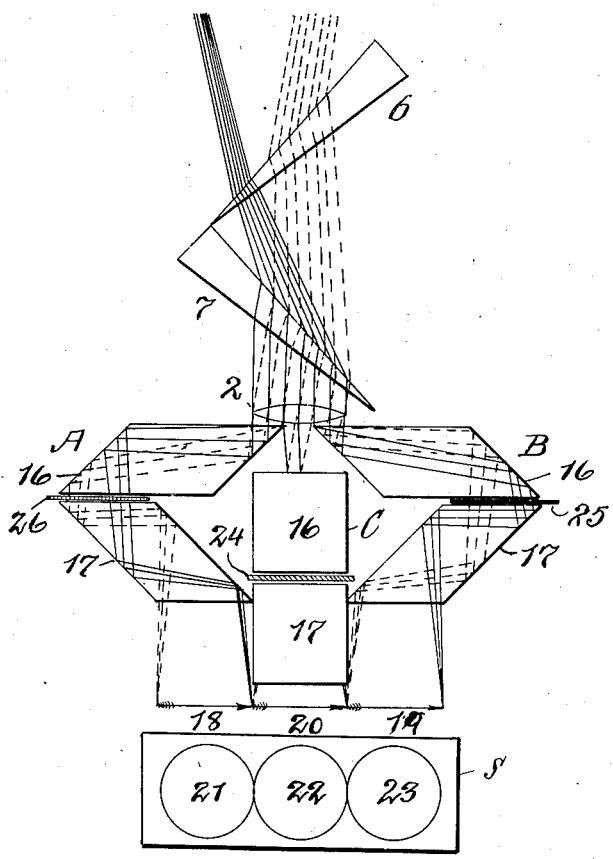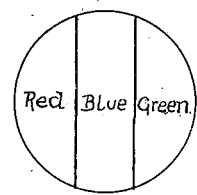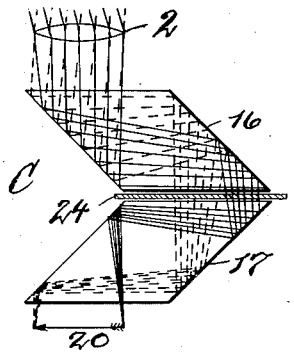

UNITED STATES PATENT OFFICE.

EDWARD C. S. PARKER, OF THE UNITED STATES NAVY.

METHOD OF AND APPARATUS FOR PRODUCING PHOTOGRAPHS AND PROJECTING THE SAME IN NATURAL COLORS.

1,328,291.  Specification of Letters Patent.  Patented Jan. 20, 1920.

Application filed May 9, 1919. Serial No. 296,008.

*To all whom it may concern:*

Be it known that I, EDWARD C. S. PARKER, of the United States Navy, a citizen of the United States, have invented a certain new and useful Improvement in Methods of and Apparatus for Producing Photographs and Projecting the Same in Natural Colors, of which the following is a specification.

The invention is an apparatus for making photographs in monochrome from a colored object and projecting an image of said object in corresponding or natural colors upon a suitable surface or screen. That is to say, the apparatus used as a camera produces images of the colored object in monochrome upon a sensitized transparent plate, film, or in general terms "slide," either stationary or moving, the light rays then proceeding from the object to the plate. When the light rays are caused to proceed in the reverse direction—that is, through the image on the transparent slide and so through the apparatus to the screen,—then the object is projected in natural colors upon said screen and either as a stationary or a moving picture, as the case may be.

In the accompanying drawings—

Figure 1 is an optical diagram, showing the normal image produced by a converging lens. Fig. 2 is a similar diagram, showing the normal image as modified by the interposition of the prisms 6, 7 between object and lens. Fig. 3 is an optical diagram, showing the duplication of the image produced by the groups of prisms A, B and illustrating the apparatus which serves both as a camera and a projector, and which as a projector causes the projected image to appear in two colors and combinations thereof on the screen. Fig. 4 is a similar diagram, showing the triplication of the image as produced by the groups of prisms A, B, C and illustrating the apparatus which serves both as a camera and a projector, and which as a projector causes the projected image to appear in three colors and combinations thereof on the screen. Fig. 5 is a side view of the prism group C and light filter 24. Fig. 6 illustrates the sections of the lens 2 which respectively produce the images 18, 20, 19 of Fig. 4 on the sensitive transparent slide and transmit the same from the slide to the screen. Fig. 7 is a portion of a moving picture film, showing thereon the circular images 12, 13 of Fig. 3.

Similar numbers and letters of reference indicate like parts.

Referring first to Fig. 1, let 1 be the object of which the image is required, and 2 a double convex lens. Then the rays from the object after traversing the lens will produce the image 3. If the shape of the area of the object be an ellipse, as shown at 4, then the shape of the area of the image produced upon a sensitized slide S will be a smaller and similar ellipse, as shown at 5, provided, of course, that there be no construction present which would in and of itself cause a distortion of the image.

In Fig. 2, I have placed between the object and the lens two prisms 6, 7, of substantially the cross sectional shape shown, disposed at an angle to one another, with the apex of the acute angle of one prism contiguous to one of the base angles of the other prism; the angle between the two prisms being adjusted so that the rays from the object will pass through the lens 2. The object 1 will then produce the image 8. But if, as before, the shape of the area of the object be an ellipse, as shown at 4, the resulting image produced upon sensitized slide S, as before, will not be a smaller ellipse, as shown at 5, but a circle, as shown at 9, the diameter of which will equal the minor axis of the elliptical image 5. That is to say:

First: In Fig. 1 the ratio of the dimensions—major axis and minor axis—of the ellipitical object 4 is the same as that of the elliptical image 5. In Fig. 2 the ratio of the dimensions—major axis and minor axis—of the elliptical object 4 is not the same as that of two diameters of the circular image 9.

Second: Comparing circle 9 with ellipse 5 and calling the minor axis of ellipse 5 and a diameter of the circle 9 parallel to said minor axis as the "height" of the images respectively represented by the elliptical and circular figures, and the major axis of ellipse 5 and a diameter of the circle 9 in line with and in prolongation of said major axis as the "width" of the images respectively represented by said elliptical and circular figures, then while the height of ellipse 5 and circle 9 remains the same, the width of the image represented by circle 9 is contracted or narrowed as compared with the width of the image represented by ellipse 5. And this will be true not only of a single object, such as a geometrical figure, but of every object within the field of the lens 2.

And, conversely, if the apparatus of Fig. 2 be used without change as a projector, then light transmitted through a transparent picture of the circle 9 on slide S and after passing through the lens 2 and prisms 7 and 6 in the order named, will produce upon a screen an image represented by the ellipse 4: or in other words, the original object with its ratio of dimensions unchanged would appear as a picture upon the screen.

Referring now to Fig. 3: It is well known that any fractional portion of a converging lens which is permitted to receive light rays from a given object will produce an image of the whole object. In Fig. 3, I have arranged in rear of the lens two groups A, B of three prisms each. These two groups are precisely alike and are so disposed that one group A receives the light rays passing through the left hand half, and the other group B the light rays passing through the right hand half of the lens 2. The arrangement of the prisms is such that, considering group A, the rays from the lens passing to prism $a$ are totally reflected to prism $b$, thence totally reflected to prism $c$, and there totally reflected twice. Two images will result, namely; image 10 produced through one half of lens 2 by the interposition of the group A of prisms, and image 11 produced in like manner by the interposition of the similar prism group B. The effect, therefore, of the two groups of prisms each receiving rays from one half of lens 2 is to separate what otherwise would be a single image 9, Fig. 2, into two images 10, 11, Fig. 3. Or if, as before, the original object is an ellipse 4, the resulting image on slide S will be not one circle, as 9 in Fig. 2, but two circles 12, 13, Fig. 3, side by side. And, conversely, as before, if this apparatus be used as a projecting device, then a transparent picture exhibiting these two circles 12, 13 would cause the production on the screen of a picture of the ellipse 4.

Now consider the interposition between prism group A and the sensitive plate or film on which the image is received of a light filter 14 of a given color—say red— and between prism group B and said plate of a light filter 15 of another color—say green. Then the red filter will stop out the green rays of the beam which traverses it and allow the red rays to pass, and the green filter will stop out the red rays of the beam which traverses it and allow the green rays to pass. Consequently circle 12 will be a monochrome image made by all rays except green, and circle 13 a monochrome image made by all rays except red.

But now reverse the operation, using the apparatus as a projector. If it is desired to retain the light filters in fixed position, the transparent photographic picture which is a negative must be changed to a positive. Otherwise filters of complementary colors must be substituted for those previously used. The filters act upon the beams coming through the transparent picture selectively—the one to transmit green, the other red light, through the prism groups A, B respectively to lens 2—and the final picture on the screen, as already explained, reproduces the original object, but now in the natural colors thereof, so far as these colors are red and green or combinations of red and green.

If, as before, suggested, there be present in the apparatus any construction which distorts the image which otherwise would be produced by the elements shown in Fig. 1, then the picture finally projected on the screen will be correspondingly distorted. This distortion may not be of a character to render the final picture on the screen disagreeable or seriously imperfect. It is not, however, a preferable or even desirable result. I refer to it here to guard against any limitation of my invention to a final picture in which the ratio of the dimensions is identical with the ratio of the dimensions of the original object.

At this point I desire to call especial attention to the fact that whether used as a photographic or as a projecting device, this apparatus is wholly static and has no moving parts. After the prisms are adjusted in place with respect to the lens, they need not be varied. In the prism groups A, B there is no loss of light because the reflections are total, and the loss in prisms 6, 7 is negligible.

Instead of being produced on a plate or slide S, the images 12, 13 can be produced on a translucent moving-picture film. Such a film S′, Fig. 7, made from the elliptical object 4 would show a succession of pairs of circles 12, 13, each pair being within the space or sections $e$, indicated by dotted lines, ordinarily occupied by a single image on the film when made in the usual manner, and the members of each pair combining to reproduce the ellipse 4 in natural colors, subject to the limitations already stated. No increase in the length of the film over that normally used for single pictures, each occupying a section $e$, is, therefore, here present or required. No change of any kind is made in the film or in its usual feeding mechanism. Because both of the constituent images are in a single section $e$ of the film, there is no "jumping" of the film to expose one section after the other in order to cause them to superpose differently filtered images on the screen. In event of breakage of a film, there is no more possibility of error in rejoining it than in any ordinary monochrome single image film—for as each pair of constituent images is in its own film section there is no way of displacing the members of the pair with reference to one another, and so throwing out the synchronization, as inevitably takes place when breakage occurs in films wherein the constituent color images are successively superposed on the screen, and especially those in which intervals between the images are alternated in such orders as first image and third, second and fourth, and so on. It is also obvious that but one light shutter is required.

For the sake of simplicity of description, I have hitherto referred to constituent images of but two colors, and have noted the attending limitations in the projected image.

In Figs. 4 and 5, I have shown the apparatus arranged for three color work—say red, green and blue. The groups A and B here each have but two prisms 16 and 17, and the prisms 16 of each group are separated so that the middle section of lens 2 (marked "blue" in Fig. 6) lying between the opposite edges of said separated prisms will produce one image, and the end sections (marked respectively "red" and "green" in Fig. 6) each one image. The rays from the end sections are twice reflected in prisms 16 and twice reflected in prisms 17 so as to produce the images indicated by the arrows 18, 19; or if the original object be an ellipse similar to 4—though, of course, in view of the enlarged scale of Fig. 4, of much greater area—then two circles 20, 21 on slide S will result. The rays from the middle section of the lens pass to a third group C of prisms similar to groups A, B but at right angles thereto, and produce the image 20. Group C is so placed between the groups A, B as that the centers of the three circles 21, 22, 23 on slide S will be in line. The color filters 24, 25, 26 (26 being red, 24 blue and 25 green) are here placed between the prisms 16, 17 of each group. The operation of this three color apparatus is the same as already described in connection with the two color apparatus of Fig. 2.

The term "slide" as herein used includes either a fixed plate or a moving film.

I claim:

1. The method of producing moving pictures which comprises forming a plurality of similarly deformed pictures of the object upon the film and then simultaneously projecting said deformed pictures to reconstruct the projection in normal proportions.

2. The method of producing moving pictures which comprises simultaneously forming a plurality of similarly deformed pictures of the object upon the film and then simultaneously projecting said deformed pictures through a deformer to reconstruct the projection in normal proportions.

3. The method of producing moving pictures in color, which comprises forming respectively through light filters of different colors a plurality of similarly deformed pictures of the object upon the film and then simultaneously projecting said deformed pictures through said light filters and a deformer to reconstruct the projection in normal proportions.

4. A photographic apparatus, comprising an objective, means interposed in the path of the rays traversing the same for varying one dimension of the image of the object, while maintaining the other dimension unchanged, and means for simultaneously producing from said image a plurality of similarly deformed images.

5. A photographic apparatus comprising an objective, means interposed in the path of the rays traversing the same for varying one dimension of the image produced thereby while maintaining the other dimension unchanged and a plurality of series of prisms for simultaneously producing from said image a corresponding plurality of correspondingly deformed images.

6. Photographic apparatus as in claim 5, the said dimension varying means being two prisms disposed at an angle to one another substantially as described and intercepting the rays passing from the object to the said objective.

In testimony whereof I have affixed my signature in presence of two witnesses.

EDWARD C. S. PARKER.

Witnesses:
   GERTRUDE T. PORTER,
   MAY T. MCGARRY.